No. 642,689. Patented Feb. 6, 1900.
B. GARLLUS.
BAND CUTTING KNIFE.
(Application filed Nov. 13, 1897.)
(No Model.)

Witnesses:
Jam T. Nielson
Eli W. Pannack

Inventor:
Bernt Garllus.

THE NORRIS PETERS CO., PHOTO-LITHO., WASHINGTON, D. C.

UNITED STATES PATENT OFFICE.

BERNT GARLLUS, OF WESTPORT, WISCONSIN.

BAND-CUTTING KNIFE.

SPECIFICATION forming part of Letters Patent No. 642,689, dated February 6, 1900.

Application filed November 13, 1897. Serial No. 658,413. (No model.)

*To all whom it may concern:*

Be it known that I, BERNT GARLLUS, a citizen of the United States, residing in the town of Westport, in the county of Dane, State of Wisconsin, have invented a new and useful Knife for Cutting Strings, Bands, and Cords, of which the following is a specification.

My invention relates to improvements in knives intended to be used for cutting cord or band, especially while threshing grain, to cut the bands by which the grain is bound; and the objects of my invention are, first, to provide a knife that is entirely safe, so that it is impossible for the operator to accidentally or otherwise cut himself or fellow workmen; second, to provide a knife that will readily find and cut that which it is intended to cut; third, to protect the cutting edge as much as possible from accidental injury and wear, and, fourth, to afford easy facilities for removing the blade for the purpose of sharpening. I attain these objects by the arrangement of parts illustrated in the accompanying drawings, in which—

Figure 1:
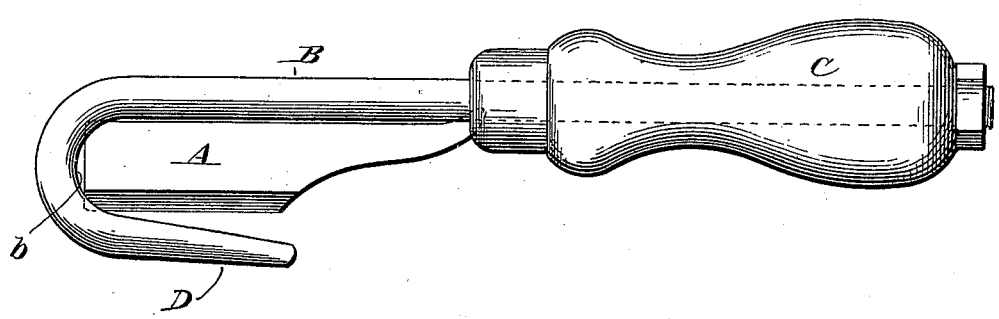
Figure 2:
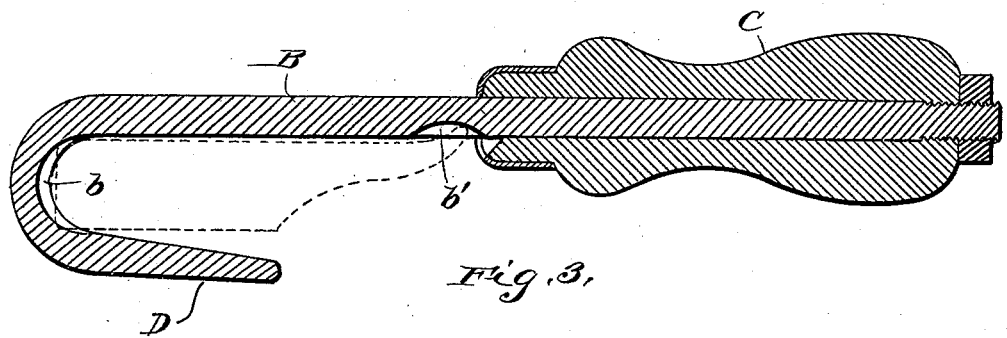
Figure 3:
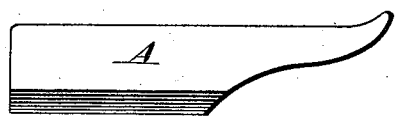

Figure 1 is a side view of the entire knife; and Fig. 2, a cross-section of the same, guarding-hook B being pulled forward and blade A removed.

The hook-shaped piece B is the safety-guard of the knife and also assists in holding the blade in position, being provided with a slot or grooves $b\ b$, Fig. 2, fitted to receive the blade.

The piece A is the blade, provided with its cutting edge $a$, as shown.

The handle C of the knife is secured to guarding-hook B, together with blade A, in such a manner that either may be easily detached or replaced at will.

I prefer to hold the blade in position by placing the hook end of the guard over the end of the blade and secure it to the handle in the manner shown.

What I claim as my invention, and desire to secure by Letters Patent, is—

In a band-cutting knife, the hook B, having grooves $b\ b$, and the hook D, the adjustable handle C, and the cutting-blade A, detachably engaging grooves $b\ b$, substantially as shown and described.

BERNT GARLLUS.

Witnesses:
JOSEPH E. MESSERSMITH,
ERNEST W. WARNER.